Figure 1:
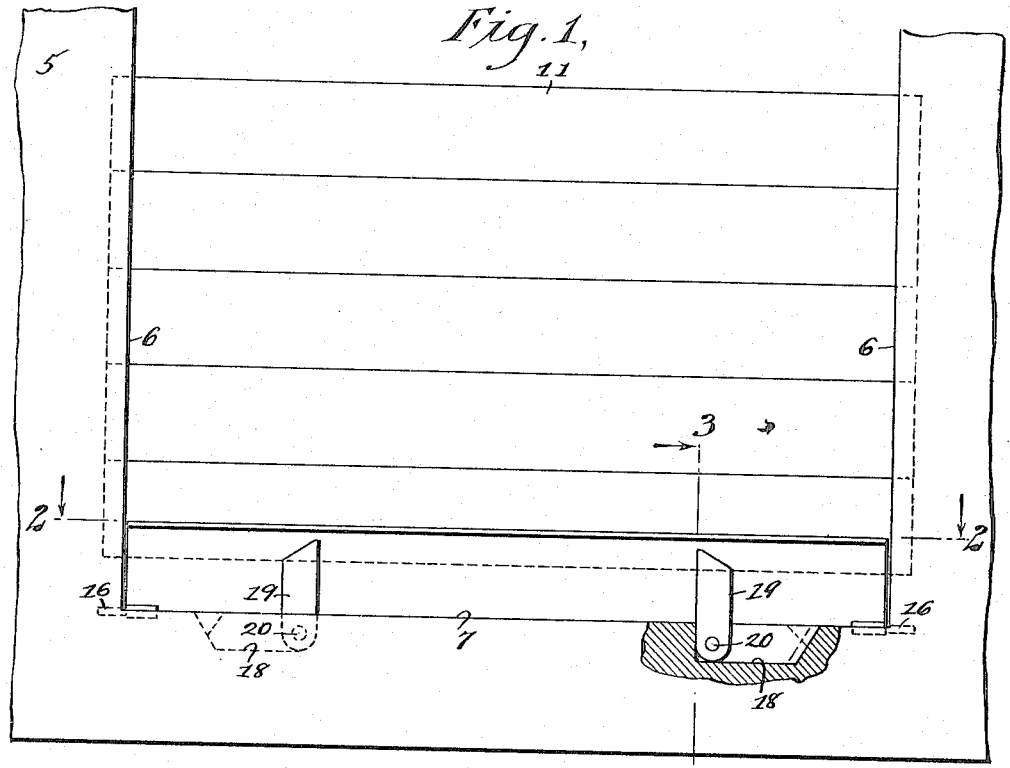

W. B. NICOLL.
GRAIN CAR DOOR.
APPLICATION FILED JULY 15, 1914.

1,128,032.

Patented Feb. 9, 1915.

WITNESSES
Edw. Thorpe
J. C. Larsen

INVENTOR
William B. Nicoll
BY Munn & Co.
ATTORNEYS

THE NORRIS PETERS CO., PHOTO-LITHO., WASHINGTON, D. C.

UNITED STATES PATENT OFFICE.

WILLIAM BIRNIE NICOLL, OF FORT WILLIAM, ONTARIO, CANADA.

GRAIN-CAR DOOR.

1,128,032. Specification of Letters Patent. Patented Feb. 9, 1915.

Application filed July 15, 1914. Serial No. 851,083.

*To all whom it may concern:*

Be it known that I, WILLIAM B. NICOLL, a citizen of the United States, and a resident of Fort William, Province of Ontario, Dominion of Canada, have invented certain new and useful Improvements in Grain-Car Doors, of which the following is a specification.

My invention relates to grain cars used upon railways to transport grains of various kinds, and the main object thereof is to provide means for permitting the discharge of the car contents without special effort and without moving the door of the car during such discharging, said means also serving as grain retaining means during the transportation of said grain.

A further object is to provide such means which are quickly and easily applied to a grain car without any material alteration therein; and a further object is to so construct the said means as to serve an important function in the car structure, besides the functions above named.

My invention is fully described in the following specification, of which the accompanying drawings form a part, in which the separate parts are designated by the same reference characters in each of the views, and in which:—

Figure 2:
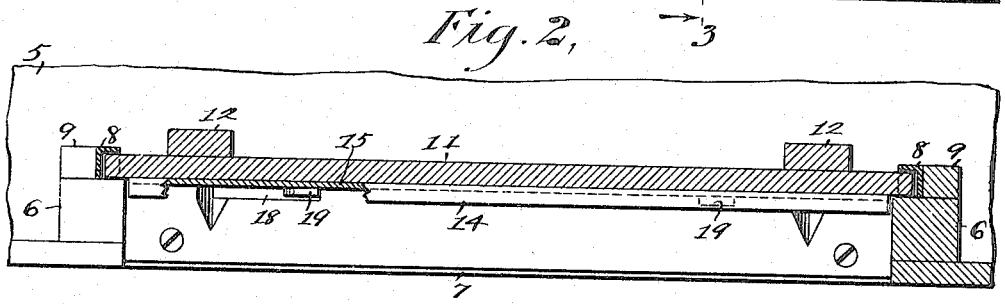
Figures 3, 4:
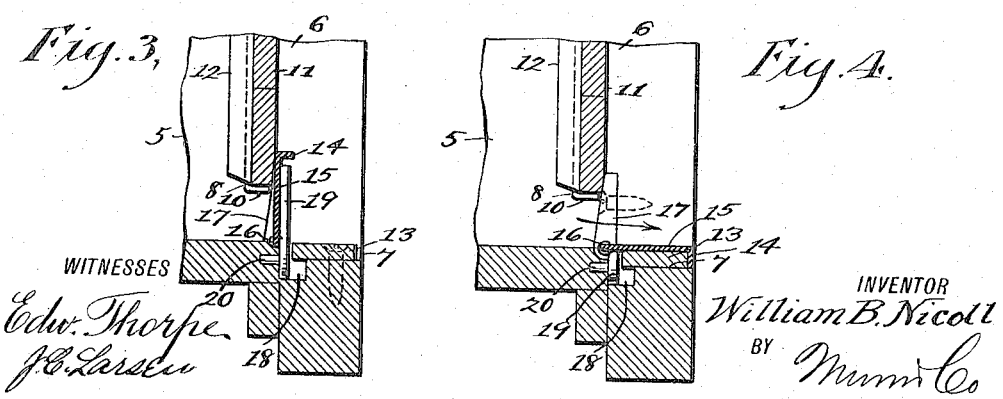

Figure 1 is a fragmentary side view of a grain car, provided with my invention in operative position. Fig. 2 is a section taken on the line 2—2 of Fig. 1; Fig. 3 is a section taken on the line 3—3 of Fig. 1; and Fig. 4 is a view similar to Fig. 3, but showing the parts in grain discharging position.

In the drawings forming a part of this application I have shown a fragment, 5, of a grain car having the usual side door opening therein, posts 6 being shown at the sides of said opening, and a sill 7 at the bottom thereof, and I provide a vertically arranged metal guide 8 on each of the posts 7, and which guides may be backed by strips 9, if desired, said guides being terminated at 10, Figs. 3 and 4, to limit the downward movement of a door 11 so that it will not touch the sill 7, a space of approximately five inches being provided beneath the said door in its lowermost position, although the exact size of this space is immaterial, and I back the said door 11 with cleats 12, said door being merely boards secured to said cleats and having only the sliding engagement with the car.

The sill 7 is preferably slightly lower than the floor of the car, as shown in Figs. 3 and 4, and, in the form shown, has a strip 13 secured on the upper surface thereof and which strip does not extend entirely to the outside edge of the sill, whereby a recess is provided for a flange 14 on a metal plate 15 hinged at 16 to blocks 17 secured at the sides of the door opening, whereby said plate 15 forms a metal surface for the sill 7, as well as a metal curbing at the outer edge thereof as plainly shown in Fig. 4, this being the position of the said plate 15 when discharging grain from the car, and when the car is unloaded, the only structural alteration in the door frame being to secure the blocks 17 thereto and preferably recessed thereinto, and it will be seen that the plate 15 is flush with the car floor and provides a smooth continuation of said floor clear to the edge of the sill 7.

The sill 7 is recessed in one or more places, two as shown, at 18 and in each of which a dog 19 is pivoted, by means of screws, pins, or equivalent, 20, in such manner that the said dogs, when in lowermost position, are beneath the plate 15 when in its lowermost position to cover the recesses 18, but the dogs 19 are adapted to be raised into substantially vertical position, as shown in Figs. 1, 2 and 3, when the plate 15 is moved into vertical position, to bear against the outer side of said plate, beneath the flange 14, and thus lock said plate 15 in this position, said plate being of a height in this position exceeding the space beneath the door 11, as clearly shown, whereby a seal for the said space is formed but, if the dogs 19 be forced into horizontal position, said plate 15 may move on its hinges outwardly and thus unseal the space beneath the door and permit the grain within the car to escape, and the car is unloaded in this manner.

The plate 15 and dogs 19 are raised into vertical positions, as will be understood, before the loading of the car, the door 11 having been previously inserted into the guides 8, at the tops thereof, and permitted to move into contact with the door stops 10, after which the car is loaded and, because of the metal plate 15 bearing against the smooth exterior of the door, no grain can escape through the door opening until the dogs 19 are deliberately forced out of locking position.

My door may be removed from its guides, after a car has been unloaded, and hooked beneath the roof of the car as is now frequently done, or the doors may be shipped in bulk and distributed for use, according to the inclinations of the officials of railways, the latter method being generally preferred, but this forms no part of my invention, as I may employ any desired method for door storage when not in use, but it will be noted that doors constructed as described cannot be nailed to the door frame, as is now common, and this is a great advantage, and saving of doors. My intent is, therefore, to provide a removale door in a suitable opening, leaving an opening beneath the same, and closing said last named opening by means of a plate serving several distinct purposes and in permanent connection with the car, whereby grain may be loaded in said car without the possibility of loss, after loading, but which permits easy unloading when desired.

While I have shown specific details I do not confine myself thereto, but may make desired changes within the scope of the following claims.

Having fully described my invention, what I claim as new, and desire to secure by Letters Patent, is:—

1. The combination with a grain car having a door opening, of a vertically movable door, means for maintaining the same at a predetermined distance above the floor of the car, a plate in pivotal connection with the car in the approximate vertical plane of the outer surface of said door, and normally serving as a shield for the door sill, said plate having a flange at its outer edge and said sill being rabbeted to receive said flange, said flange being arranged perpendicular to said door when said plate is in vertical, closure, position to close the space between said door and car floor and serving as a brace for said plate and door to prevent outward bulging thereof, and means for holding said plate in such closure position.

2. The combination with a grain car having a door opening, of a vertically movable door, means for maintaining the same at a predetermined distance above the floor of the car, a plate in pivotal connection with the car in the approximate vertical plane of the outer surface of the door and normally serving as a shield for the door sill, said plate having a flange at its outer edge and said sill being rabbeted to receive said flange, said flange being arranged perpendicular to said door when said plate is in vertical, closure, position to close the space between said door and car floor and serving as a brace for said door and plate to prevent outward bulging thereof, and pivoted dogs beneath said plate movable in a vertical plane to lock said plate in said closure position, said sill being provided with pockets to receive said dogs when said plate is in sill shielding position.

In testimony whereof I have signed my name to this specification in the presence of the subscribing witnesses.

WILLIAM BIRNIE NICOLL.

Witnesses:
N. J. BEARD,
R. H. HOLLIS.

Copies of this patent may be obtained for five cents each, by addressing the "Commissioner of Patents, Washington, D. C."